UNITED STATES PATENT OFFICE.

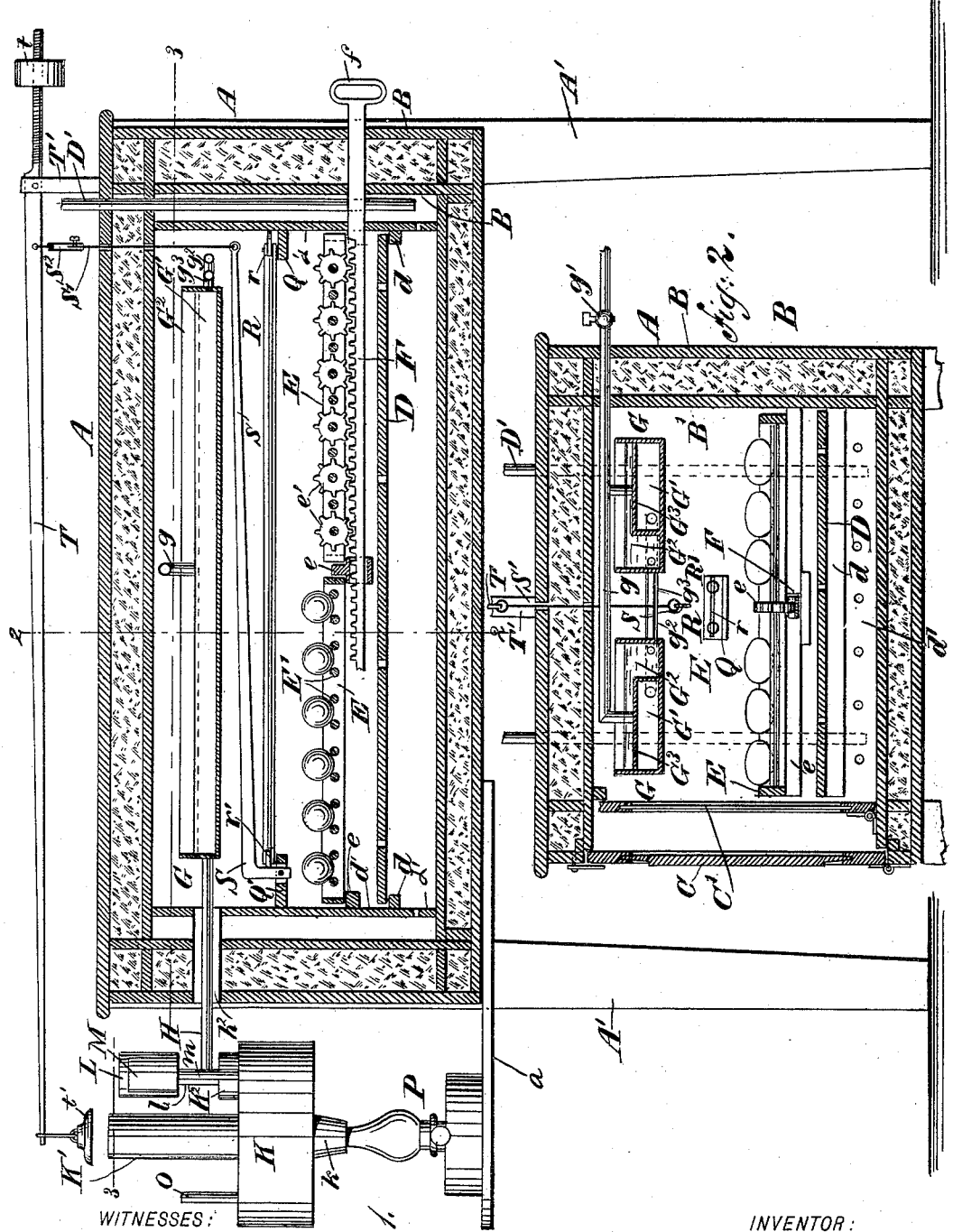

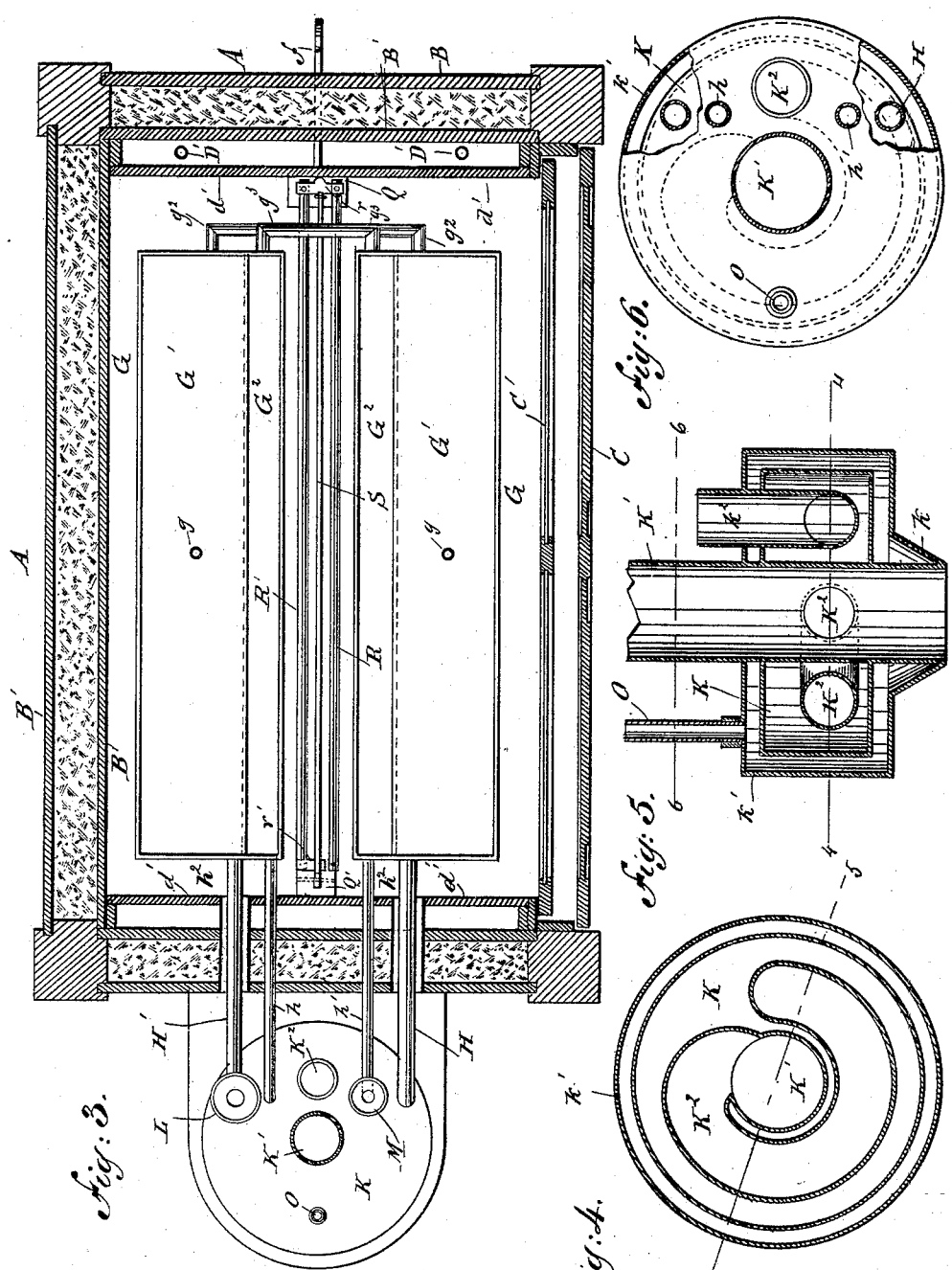

ARCHER H. BURR, OF OMAHA, NEBRASKA.

INCUBATOR.

SPECIFICATION forming part of Letters Patent No. 456,794, dated July 28, 1891.

Application filed February 24, 1891. Serial No. 382,391. (No model.)

*To all whom it may concern:*

Be it known that I, ARCHER H. BURR, of Omaha, in the county of Douglas and State of Nebraska, have invented a new and Improved Incubator, of which the following is a full, clear, and exact description.

My invention is an improvement in that class of incubators adapted for automatically supplying the egg-chamber with the right amount of moisture and air, and which will automatically maintain an even temperature in the egg-chamber if a sufficient amount of heat is supplied to the heating-tank.

My invention consists in certain features of construction and combinations of parts, which will be hereinafter described and claimed.

Reference is to be had to the accompanying drawings, forming a part of this specification, in which similar letters of reference indicate corresponding parts in all the figures.

Figure 1 is a vertical longitudinal section of the incubator, showing the heating attachment in elevation. Fig. 2 is a cross-section on the line 2 2 of Fig. 1. Fig. 3 is a sectional plan of the incubator on the line 3 3 of Fig. 1 and with the rack and egg-trays removed. Fig. 4 is a cross-section through the heating-tank on the line 4 4 of Fig. 5. Fig. 5 is a broken vertical section of the heating-tank on the line 5 5 of Fig. 4, and Fig. 6 is a broken sectional plan of the heating-tank on the line 6 6 of Fig. 5.

The body or case A of the incubator is preferably mounted upon legs A', and is provided with an outer and inner wall B and B', the space between the walls being filled with sawdust or equivalent material, so that a continued even temperature may be easily maintained in the egg-chamber, the sawdust serving to prevent the chamber from being chilled. The body is provided with double doors C and C' on one side, the doors being preferably arranged to swing vertically and the inner door is made of glass, so that when one wishes to inspect the egg-chamber the outer door may be opened and one may look through the inner door without having to admit cold air to the egg-chamber.

In the lower part of the egg-chamber is a perforated false bottom D, which rests upon supports $d$ on the partitions $d'$, which partitions extend transversely across the ends of the egg-chamber and are perforated near the bottom. The foul air in the incubator will settle through the false bottom, will pass through the partition $d'$, and will escape through the ventilating-pipes D', which extend from the rear of one of the partitions $d'$ through the top of the incubator. If desired, the ventilating-pipes may be arranged in both ends of the incubator.

There are two egg-trays E, although more or less may be used, which are of a rectangular shape and are supported upon brackets $e$, and the egg-trays are provided with transverse rollers E', which are adapted to support the eggs, and which are arranged in pairs, one of each pair having centrally thereon a cog-wheel $e'$, and the cog-wheels mesh with a rack F, which extends longitudinally beneath the trays and is supported in a hanger formed on the central tray-support $e$. The rack extends through one end of the case and terminates in a handle $f$, and by moving the rack the rollers connected therewith and the eggs on the rollers will be turned, and consequently it will not be necessary to open the inner door of the egg-chamber after the eggs are put in place. If desired, every roller may be provided with a cog-wheel, and the cog-wheels and rack may be arranged at one end of the egg-trays.

In the upper part of the egg-chamber is a pair of tanks G, which supply heat and moisture to the chamber, each tank being divided into two compartments by an angular partition $G^3$, which extends longitudinally through the tanks, thus forming a double tank, the lower compartment G' being entirely inclosed and the upper compartment $G^2$ being open at the top, so that the vapor or steam from the upper compartment may permeate the chamber and moisten the eggs. The inclosed compartments G' are provided with a pipe $g$, which opens from the tops of the compartments and through the side of the case, and which is closed by a stop-cock $g'$ so that by opening the cock a vent may be provided to enable the compartments to be easily filled. The lower compartments G' of the tanks are connected by a pipe $g^2$, which provides for circulation, and the upper compartments of the tanks are connected by a pipe $g^3$.

The lower compartments of the tanks G are connected by a supply and return pipes H and H' with the outside heating-tank K, and the upper compartments G² of the said tanks are connected with the outer chamber of the heating-tank by direct and return pipes $h$ and $h'$, and the pipes extend through tubes $h^2$, which admit fresh air to the incubator. The tank K is preferably of a circular shape, and extending vertically through it is a flue K', the lower end of which $k$ extends beneath the tank, and opening laterally from the flue near the center of the tank is a side flue K², which extends around the main flue and opens finally through the top of the tank, as best shown in Fig. 5. The tank K supplies hot water to the lower compartments G' of the inside tanks G. The tank K is entirely surrounded by another tank or chamber $k'$, which chamber connects, by means of the pipes $h$ and $h'$, with the upper compartments G² of the inside tanks.

The tank K is filled from a fount L, which is arranged above it, and which connects with it by means of a pipe $l$, and the chamber $k'$ is filled from a similar fount M, which is also arranged above the tank, and which connects with the chamber by means of a pipe $m$. The chamber $k'$ is provided at the top with a vertical water-gage O, which is made of glass, and the top of which is level with the top of the compartments G² of the inside tanks, and by means of this gage one can easily tell whether or not there is sufficient water in the said compartments.

The water-tanks are heated by a lamp P, which rests on a shelf $a$, secured to the under side of the main body or case A so as to extend from one end, and the heat from the lamp will ordinarily pass upward through the flue K' without heating the water to any great extent; but when the heat is directed through the side flue K² the water is quickly heated, as the side flue has a much greater heating-surface, whereby by regulating the passage of the heat through the flues any desired amount of heat may be maintained.

The following mechanism is used for regulating the heat of the egg-chamber and maintaining a perfectly even temperature therein. On one partition $d'$ within the egg-chamber is a bracket Q, and on the opposite partition is a slotted bracket Q', the brackets being arranged directly above the egg-trays, and mounted loosely on these brackets is a pair of copper tubes R R', which at one end rest upon the bracket Q and at the other end rest loosely on the bracket Q', with the end of the rod R abutting with a shoulder on the bracket, as shown in Fig. 3. The ends of the tubes which rest on the bracket Q are united by a cross-bar $r$, which is pivoted at the center on the bracket, and the opposite end of the tube R' is formed into an inwardly-bent arm $r'$, which abuts with the short end of an elbow-lever S, the said lever being pivoted in the slot of the bracket Q', so that the long arm of the lever will extend longitudinally through the egg-chamber above the tubes R R'. To the free end of the lever is attached a rod S', which extends vertically through the top of the case, and is secured in a sleeve S² by means of a set-screw, the sleeve S² being secured to the under side of a lever T, which lever is pivoted in a support T' on the top of the case. The sleeve S² and the set-screw therein afford an easy means for adjusting the rod S' in relation to the lever T.

The lever T is pivoted near one end, and the short end of the lever is threaded and provided with a weighted nut $t$, which fits the thread on the lever, so that it may be easily adjusted. The long end of the lever extends to a point above the flue K' of the heating-tank, and attached to this end of the lever is a cap $t'$, which cap is adapted to close the top of the flue, and thus direct the heat through the side flue K².

The operation of the incubator is as follows: The tank K and chamber $k'$ are filled with water, and when these are filled the water will also flow through and fill the inside tanks G. The eggs to be hatched are placed upon the rollers of the egg-tray, and the lamp P is lighted and placed with its chimney entering the flue K'. The lever T and cap $t'$ are adjusted by means of the nut $t$ so that nearly the right amount of heat will pass through the side flue K², and after that if the lamp is kept burning the incubator takes care of itself. The hot water which enters the compartments of the inside tanks G' from the main tank will heat the egg-chamber and will also evaporate the water in the upper compartments G², and the escaping vapor will give the requisite amount of moisture to the eggs, and the damp and foul air will settle beneath the false bottom D and pass out through the ventilating-tubes D'. When the heat rises beyond a certain point in the egg-chamber, the tubes R will expand and the arm $r'$ will press upon the lever S, thus raising the lever and the long end of the lever T, with which it is connected, and this movement of the lever T raises the cap $t'$, so that the heat will escape from the flue K' without passing through the side flue K². If the heat in the chamber goes below a certain point, the tubes R contract, the levers S and T drop, thus bringing the cap $t'$ nearer the top of the flue K'. The heat will then pass through the side flue, and additional heat will be supplied to the egg-chamber. It will thus be seen that a perfectly even temperature will be constantly maintained in the egg-chamber.

It will be noticed that the tube R rests against a shoulder on the bracket Q' at one end and is pivotally connected with the tube R' at the opposite end, so that the tubes are extremely sensitive to heat changes and have a double action, as the expansion of the tube R tilts the cross-bar $r$ and pushes endwise upon the rod R', so that the latter rod acts on the lever S with the force of its own expansion and also that of the tube R.

When the eggs are being hatched, the chickens as they issue from the shells will drop through between the rollers upon the false bottom D or upon a suitable frame which may be inserted to receive them, and they will thus be prevented from disarranging the other eggs.

Having thus fully described my invention, I claim as new and desire to secure by Letters Patent—

1. In an incubator, the combination, with the egg-trays mounted in the main case, said egg-trays having transverse rollers provided with cog-wheels, of a rigid rack extending through the walls of the case and longitudinally beneath the trays and supported centrally in the case, whereby it is adapted for meshing with the cog-wheels, substantially as described.

2. An incubator comprising a double-walled case having egg-trays therein, double tanks located above the egg-trays, the upper compartments of said tanks being open, an outside double tank having means for heating it, as described, and connections between the outside tank and the inside tanks, substantially as described.

3. In an incubator, the heating-tank comprising a central tank having a vertical flue extending through it and having a side flue opening from the main flue and through the top of the tank, and an outer chamber surrounding the main tank, substantially as described.

4. In an incubator, the heating-tank comprising a main tank having a flue extending vertically through it and having a side flue opening from the main flue and through the top of the tank, an outer chamber inclosing the main tank, and founts mounted above the tank and connected by pipes with the outer and inner chambers, substantially as described.

ARCHER H. BURR.

Witnesses:
WM. W. BINGHAM,
J. GLENN.